J. LACEY.
Wheel-Cultivator.
No. 41,709. Patented Feb. 23, 1864.
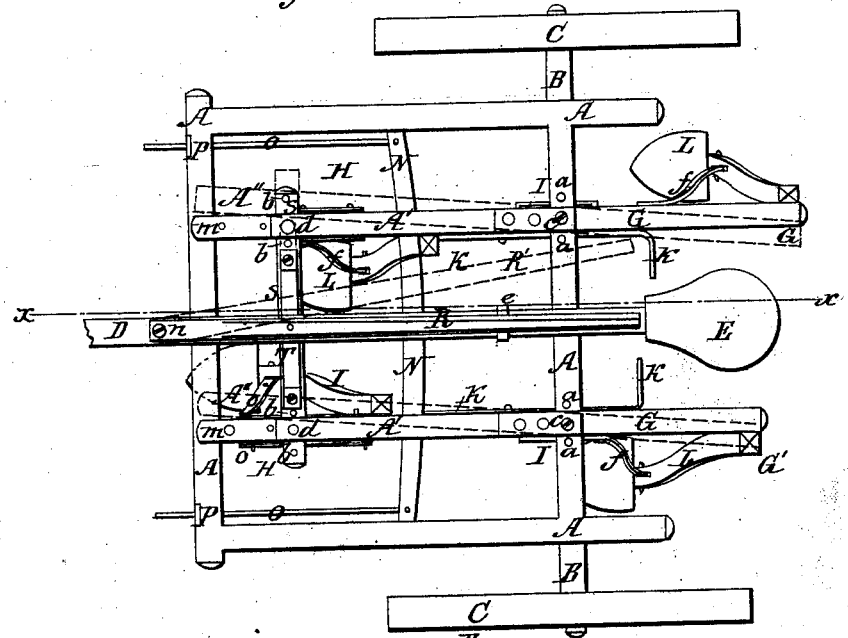
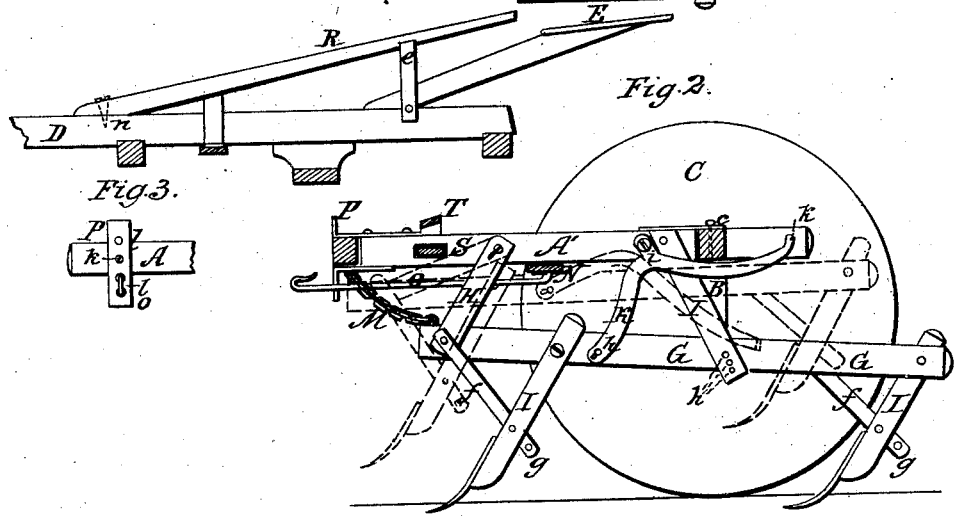
Witnesses.
L. L. Bond
Inventor.
John Lacey.

UNITED STATES PATENT OFFICE.

JOHN LACEY, OF CHICAGO, ILLINOIS.

IMPROVEMENT IN CULTIVATORS.

Specification forming part of Letters Patent No. 41,709, dated February 23, 1864.

*To all whom it may concern:*

Be it known that I, JOHN LACEY, of the city of Chicago, in the county of Cook and State of Illinois, have invented certain new and useful Improvements in Cultivators; and I do hereby declare that the following is a full, clear, and exact description of the construction and operation of the same, reference being had to the annexed drawings, making a part of this specification, in which—

Figure 1 is a top view, Fig. 2 a vertical section at the red line *x x*, and Fig. 3 a front view, of the draft guide-plate.

Like letters refer to similar parts in all of the figures.

The nature and object of my invention consist in arranging the frame and operative parts of a cultivator of the class usually denominated "straddle-row cultivators," or those where both sides of a corn-row are cultivated by the same operation of the machine, so as to dispense with the usual lower or double frame, and at the same time preserve the height above the ground which is necessary for cultivators of this class; in constructing and arranging the parts so as to regulate and adjust the space between the plows, in order to enable the operator to plow close to the rows or at a short distance from them, as he may desire, and also to adjust the line of the draft of the front and rear plows so as to make them follow in nearly the same furrow or spread them; in combining a hand-lever provided with a rest, *e*, connecting-bars, bow, and pivotal bolts with the movable beams A′ and G, so as to enable the operator to cultivate corn when a part of the hills is out of the line of the row without destroying such hills or changing the direction of the machine; in combining the bars H, plow-beams G, and chain M with the movable beams A′ and G, for the purpose of dispensing with the lower frame-work for raising the plows out of the ground and giving the beams G a forward motion; in hinging the movable beams A′ at their rear end, so that when the plow-beams G are suspended from them and the rear plow attached back of such hinge-joint the plows will move in opposite directions when the lever R is turned and bring the plows on the side of the outward bend in the row nearly in a line and spread those on the opposite, so as to cultivate the entire space between the rows without going over the same ground twice; in constructing a foot-lever or treadle, K, provided with a slot, so as to allow the vertical motion of the plow-beams G, and also raise the plows out of the ground and operate each side independently of the other; and in attaching to the rear end of the movable beams A′ a stirrup, I, provided with a series of holes to regulate the height of the rear plows, and to keep the plow-beams G in place and allow them to play freely up and down so as to accommodate their working and adapt them to the inequalities of the surface of the ground.

To enable others skilled in the art to make and use my invention, I will proceed to describe its construction and operation.

I construct my frame A of wood of sufficient strength to sustain it in operation. The side pieces are about four feet and two inches in length, and the cross-pieces are about three feet and ten inches.

The axle B may be made of wood or other suitable material of sufficient size and strength to sustain the machine, and is turned upward, as shown at Fig. 2, and attached to the frame A or extended across and made a part of such frame. The height to which it is carried up depends upon the size of the wheels C, said wheels being made in the usual manner. I consider three feet to be about the necessary height for the frame to be above the ground, and about five feet for the distance between the wheels.

In the frame A, I place two beams, A′, which are hinged to the rear cross-bar of the frame by rests and the pivotal pins or bolts *c*, and are supported in front by the slide-rests *m*. Near the front end of these movable beams they are connected with each other by the connecting-bar S, which passes through a mortise in them, and is connected with them by the bolts or pins *d*. This connecting-bar is provided with a series of holes, *b b*, on each end, which are made to correspond with similar series of holes, *a a*, in the rear cross-beam of the frame A. It (bar S) passes under the tongue or draft-pole D, and I attach the bow T to it, which is carried over said draft-pole; but by making this bow of sufficient strength that portion of the connecting-bar which passes under the draft-pole may be dispensed with and the connection made with a single piece. At the middle of this bow the hand-lever R is attached. The hand-lever R is pivoted to the draft-pole at *n* and carried back to the driver's seat E, and is provided with a rest at *e* to keep the beams A' in place when the corn-rows are straight. When the rows are crooked or a part of the hills are out of line, the driver, by turning this lever in the proper direction, can pass the plows around them without changing the direction of the team or machine; but while my device for doing this is new, this result is not peculiar to my machine. Only one of these movements is indicated in the drawings by the dotted lines; but it operates similarly either way.

I adjust the distance between the plows by means of the pivotal pins or bolts *c* and *d* and the holes in series *a* and *b*. By means of these, and by reason of attaching the plows on either side to a single beam, I am also enabled to increase or diminish the amount of ground cultivated by a single operation, as by placing the pins or bolts *d* in the inside holes of the connecting-bar S and the outside holes of the rear cross-bar of the frame the amount of ground covered by the plow is increased, and by placing the pins or bolts *d* in the outer holes of the bar S and the inside holes of the frame the plows are brought nearly in a line and the amount of surface plowed over is diminished. These are the extremes, and a less change in the holes and bolts or pins will of course diminish this effect.

I attach to the movable beams A', near their front ends, on each side of both beams, the bars H, which are made of iron or other suitable material, and are pivoted to said beams at *o* in such a manner as to give them a forward and return motion without a side motion. At the rear end of these beams A', I attach stirrups I, which are made of iron, firmly to them, with an inclination backward, as shown at Fig. 2. This stirrup is also provided with a series of holes, *p*, and a pin, in order to regulate the depth of the furrow made by the rear plows. I pass the plow-beam G through these stirrups, in which they rest loosely, and attach the front ends of said beams G, at their sides, to the lower ends of the bars H. On the top of these beams, also at the front end, I insert staples, and attach thereto the chains M, which are carried upward and forward, and attached by hooks to the front ends of the movable beams A'. These chains or their equivalents occupy an important position in my invention, as by means of them I am enabled to dispense with a lower frame and give the beams G a strong and secure draft from the upper works. By them and the hooks the beams G may be raised or lowered, and they regulate the depth of the furrows made by the front plows, as by shortening the chain or taking up a few links on the hook the plows cannot go as deep, and by letting them out the plows go into the earth at a greater depth. They also operate in the lateral movements of the cultivator, and by their use I am enabled to attach a simple device for raising the plows out of the ground.

For the purpose of raising the plows to facilitate turning, and for other purposes, I attach the bent levers or treadles K to the beams A' by the projection and bolt *i*. They are carried down, as shown in Fig. 2, and at their lower end provided with a slot, *h*, so as to accommodate them to the height of the beams G when said beams are raised or lowered, and also to allow the plows to work over uneven surfaces. Through this slot *h*, I insert a bolt into the beams G. These levers or treadles are carried back, and their ends turned inward at the proper point to be operated by the feet of the driver when seated at E. The sides in this respect work independently of each other, and in operation the plows are brought out of the ground, or nearly out, perpendicularly by means of the slot *h*, and when the slot ceases to operate the beams G and plows are carried upward and forward.

On the outside of the beams G, at their rear ends, and on the inside, near the front ends, I attach ordinary shovel or cultivator plows, except that the standards are bent, as shown at Fig. 1, in order to spread them when attached to a single beam. I carry the front plows as far forward as is practicable, in order to bring them more directly under the eye of the driver. All of the plows are supported by the rods or bars *f* and adjusted in their pitch by the holes *g*.

The draft-pole or tongue D is made in the usual manner, and is carried across the frame in one or more pieces, and at the rear end supports the driver's seat E. On the under side of this draft-pole I attach the double-tree N in such a position in the frame as not to seriously obstruct the view of the driver. From this double-tree the draft-rods O are carried forward through the draft guide-plates P. These plates P, Fig. 3, are provided with a series of holes, *l*. The rods O are permanently placed in the lower one and a screw-bolt in such of the others as may be desired, to raise or lower the rods O, and the draft is adjusted to the beam or to the draft-pole by raising or lowering the guide-plate by means of said screw-bolt, forming, when complete, a cheap, effective, and desirable cultivator, and one which is easily operated under all circumstances.

Having thus fully described my invention, I will state that I do not claim the double-tree, draft-rods, plows, raised axle, frame A, draft-pole, or seat.

What I claim as my invention, and desire to secure by Letters Patent, is—

1. The arrangement of the pivotal bolts or pins *c* and *d* and the holes *a* and *b*, the movable beams A' and G, stirrup I, and bars H, for regulating and adjusting the draft of the plows.

2. The combination of the lever R, the rest or stop e, connecting-bar S, bow T, and pivotal bolts c and d with the movable beams A' and G.

3. The combination of the bars H, stirrup I, and chain M with the movable beams A' and G.

4. Hinging the rear ends of the movable beams A' between the front and rear plows by the pin c, so as to move such front and rear plows in opposite directions, all being constructed and operating substantially as set forth and specified.

JOHN LACEY.

Witnesses:
  L. L. BOND,
  WM. B. SNOWHOOK.